(12) United States Patent
Davydov et al.

(10) Patent No.: US 11,877,309 B2
(45) Date of Patent: Jan. 16, 2024

(54) BEAM MANAGEMENT WITH FLEXIBLE BEAM-FORMING ASSIGNMENT

(71) Applicant: Intel Corporation, Santa Clara, CA (US)

(72) Inventors: Alexei Davydov, Nizhny Novgorod (RU); Avik Sengupta, San Jose, CA (US); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 235 days.

(21) Appl. No.: 17/100,417

(22) Filed: Nov. 20, 2020

(65) Prior Publication Data

US 2021/0076391 A1    Mar. 11, 2021

Related U.S. Application Data

(60) Provisional application No. 62/940,719, filed on Nov. 26, 2019.

(51) Int. Cl.
| | |
|---|---|
| *H04W 72/542* | (2023.01) |
| *H04L 5/00* | (2006.01) |
| *H04W 72/044* | (2023.01) |
| *H04W 72/51* | (2023.01) |

(52) U.S. Cl.
CPC ........... *H04W 72/542* (2023.01); *H04L 5/005* (2013.01); *H04W 72/044* (2013.01); *H04W 72/51* (2023.01)

(58) Field of Classification Search
CPC . H04W 72/044; H04W 72/51; H04W 72/542; H04B 7/0695; H04B 7/088; H04L 5/0007; H04L 5/0023; H04L 5/0048; H04L 5/005; H04L 5/0057; H04L 5/0091; H04L 5/0094
See application file for complete search history.

(56) References Cited

U.S. PATENT DOCUMENTS

| | | | |
|---|---|---|---|
| 5,852,630 A * | 12/1998 | Langberg | H04L 27/2647 375/219 |
| 2020/0145062 A1 * | 5/2020 | Jung | H04W 52/0216 |
| 2021/0044397 A1 * | 2/2021 | Khoshnevisan | H04W 72/51 |
| 2022/0166468 A1 * | 5/2022 | Go | H04L 5/00 |
| 2022/0295299 A1 * | 9/2022 | Park | H04B 7/0404 |

* cited by examiner

*Primary Examiner* — Siu M Lee
(74) *Attorney, Agent, or Firm* — Schwabe, Williamson & Wyatt, P.C.

(57) ABSTRACT

Disclosed embodiments are related to beam management in cellular communication networks, and in particular, provide a new transmission (Tx) beamforming indication based on the flexible Tx beam-forming assignment on the corresponding reference signal configured in a transmission configuration indicator (TCI) state for downlink (DL) or spatial relation information in the uplink (UL). The Tx beam-forming on the reference signal of the TCI state configured for the DL physical channel/reference signal can be updated based on reported Tx beam in the UL or using UL measurements from Sounding Reference Signal (SRS) transmission. Similarly, spatial relation information configuration used to indicate Tx beam-forming in the UL, may be also updated based on the reference signal measurements in DL or by suing Downlink Control Information (DCI) based beam indication in a scheduling request indicator (SRI). Other embodiments may be described and/or claimed.

20 Claims, 8 Drawing Sheets

US 11,877,309 B2

BEAM MANAGEMENT WITH FLEXIBLE BEAM-FORMING ASSIGNMENT

RELATED APPLICATIONS

The present application claims priority to U.S. Provisional App. No. 62/940,719 titled "BEAM MANAGEMENT WITH FLEXIBLE BEAM-FORMING ASSIGNMENT" filed on Nov. 26, 2019, the contents of which are hereby incorporated by reference in its entirety.

FIELD

Various embodiments of the present application generally relate to the field of wireless communications, and in particular to beam management in cellular communication networks.

BACKGROUND

Beam management refers to a set of L1/L2 procedures to acquire and maintain a set of transmission/reception point(s) (TRP or TRxP) and/or UE beams that can be used for downlink (DL) and uplink (UL) transmission/reception. Beam management includes various operations or procedures, such as beam determination, beam management, beam reporting, and beam sweeping operations/procedures. Current 3GPP Fifth Generation (5G) standards/specification releases there is fixed/static relation between a transmission (Tx) beam and reference signals. In particular, according to release (Rel)-15 NR specifications, a user equipment (UE) may assume that synchronization signal (SS)/physical broadcast channel (PBCH) block with the same index is quasi-co-located (QCL'd) with respect to all parameters across different time occasions of SS/PBCH block (SSB). Such static Tx beamforming assignment allows efficient beam Tx and reception (Rx) beam pair acquisition. However, the actual Tx beamforming indication may require high layer signalling that creates a noticeable latency.

DETAILED DESCRIPTION

In the detailed description to follow, for ease of understanding, the present disclosure will be presented in the context of the Third Generation Partnership Project (3GPP) systems. However, the present disclosure is not limited to 3GPP compliant system only, and may be practiced in any communication system or network.

Beam management refers to a set of layer 1 (L1)/layer 2 (L2) procedures to acquire and maintain a set of transmission/reception point(s) (TRxP) and/or user equipment (UE) beams that can be used for downlink (DL) and uplink (UL) transmission (Tx) and reception (Rx). Beam management includes various operations or procedures, such as beam determination, beam management, beam reporting, and beam sweeping procedures. Beam determination refers to the ability to select of Tx/Rx beam(s). Beam measurement refers to the ability to measure characteristics of received beamformed signals. Beam reporting refers the UE's ability to report information of beamformed signal(s) based on beam measurements, such as beam failure reports, beam measurement reports, and the like. Beam sweeping refers to operation(s) of covering a spatial area, with beams transmitted and/or received during a time interval in a predetermined manner.

As mentioned previously, currently 3GPP specifications/releases there is fixed/static relation between a Tx beam and one or more reference signals. For example, a UE (e.g., UE 202 of FIG. 2) may assume that a synchronization signal (SS)/physical broadcast channel (PBCH) block with the same index is quasi-co-located (QCL'd) with respect to all parameters across different time occasions of the SS/PBCH block (SSB) (also referred to as a synchronization signal block (SSBs)). Such static Tx beamforming assignment allows efficient beam Tx and Rx beam pair acquisition. However, the actual Tx beamforming indication may require high layer signalling that therefore implies noticeable latency.

Figure 1:
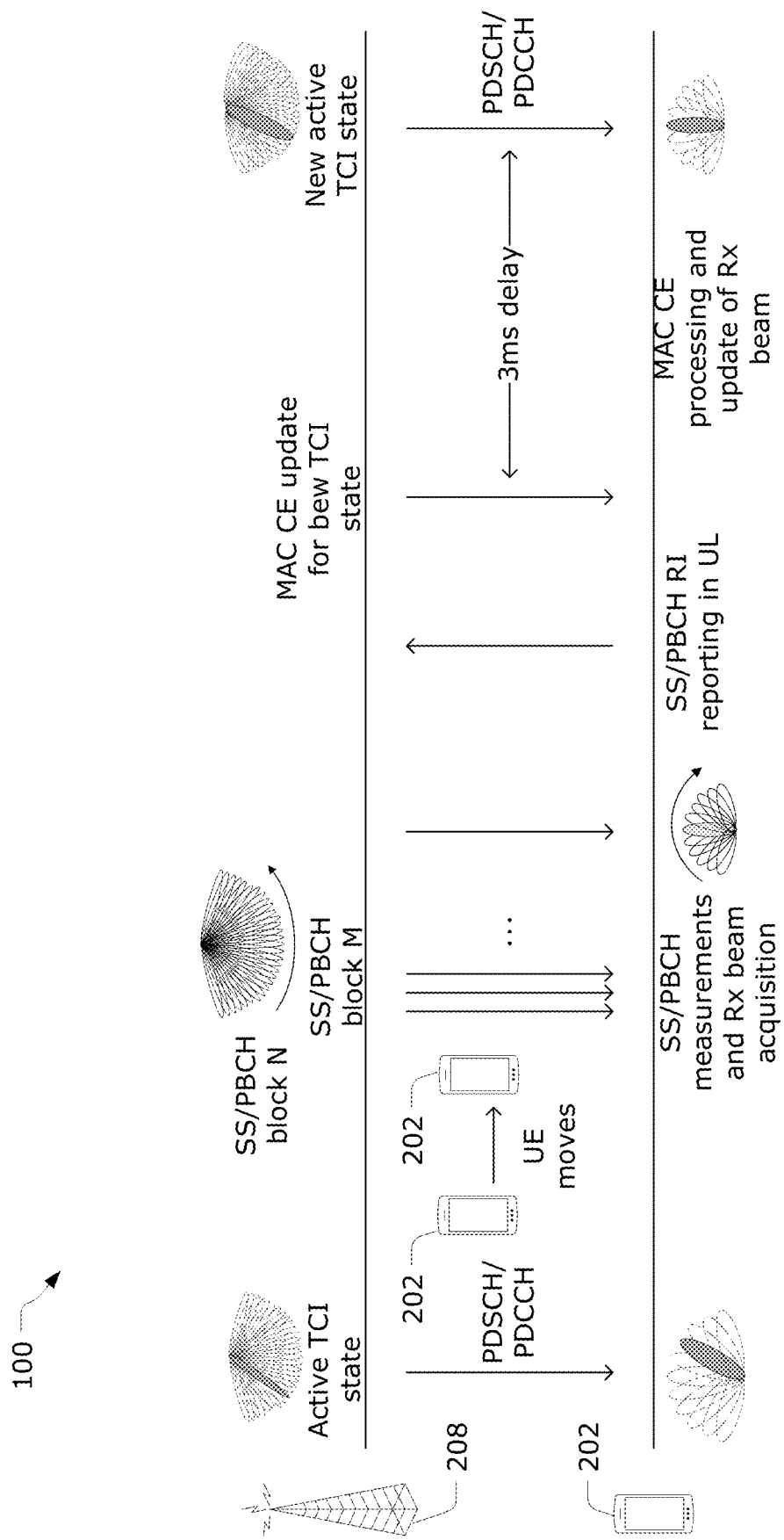
FIG. 1 illustrates an example beam indication using fixed/static Tx beam-forming assignment.

For example, FIG. 1 illustrates an example 100 where beam indication uses fixed/static Tx beam-forming assignment. As shown by FIG. 1, UE 202 may be configured to perform beam management using SSBs. The UE 202, based on corresponding configuration, performs layer 1-reference signal received power (L1-RSPR) or layer 1-signal-to-noise and interference ratio (L1-SINR) measurements, identifies a new Tx beam, and reports this information to access network node (AN) 208 using index of the most appropriate SSB. In this scenario, in order to change the Tx beam for certain physical channel or reference signal, AN 208 should indicate a new transmission configuration indicator (TCI) state that includes a selected SSB. Such indication is usually performed by high-layer signalling (e.g., Radio Resource Control (RRC) or Medium Access Control (MAC) Control Element (CE)) and takes at least 3 ms between indication of new TCI state and application of the new Rx beam.

Previous solutions rely on the beam indication for physical channels/reference signals using TCI state (for DL) or spatial relation info (for UL). TCI state includes reference signal(s) which are using static/fixed beam-forming assignment consistent over the time/multiple transmission occasions. In such Tx beam-forming assignment framework, new Tx beam indication for certain physical channel or reference signal introduces noticeable latency due to higher layer signalling.

Disclosed embodiments include a new transmission (Tx) beamforming indication based on the flexible Tx beam-forming assignment on the corresponding reference signal configured in a transmission configuration indicator (TCI) state for downlink (DL) or spatial relation information in the uplink (UL). The Tx beam-forming on the reference signal of the TCI state configured for the DL physical channel/reference signal can be updated based on reported Tx beam in the UL or using UL measurements from Sounding Reference Signal (SRS) transmission. Similarly, spatial relation information configuration used to indicate Tx beam-forming in the UL, may be also updated based on the reference signal measurements in DL or by suing Downlink Control Information (DCI) based beam indication in a scheduling request indicator (SRI). Other embodiments may be described and/or claimed. The flexible beam-forming assignment for the reference signal configured in TCI state (e.g., Channel State Information (CSI)-Reference Signal (RS)) or RS configured in spatial relation information (e.g., SRS) allows more efficient Tx beamforming updates without involving high layer signalling (in comparison to existing approaches).

Figure 2:
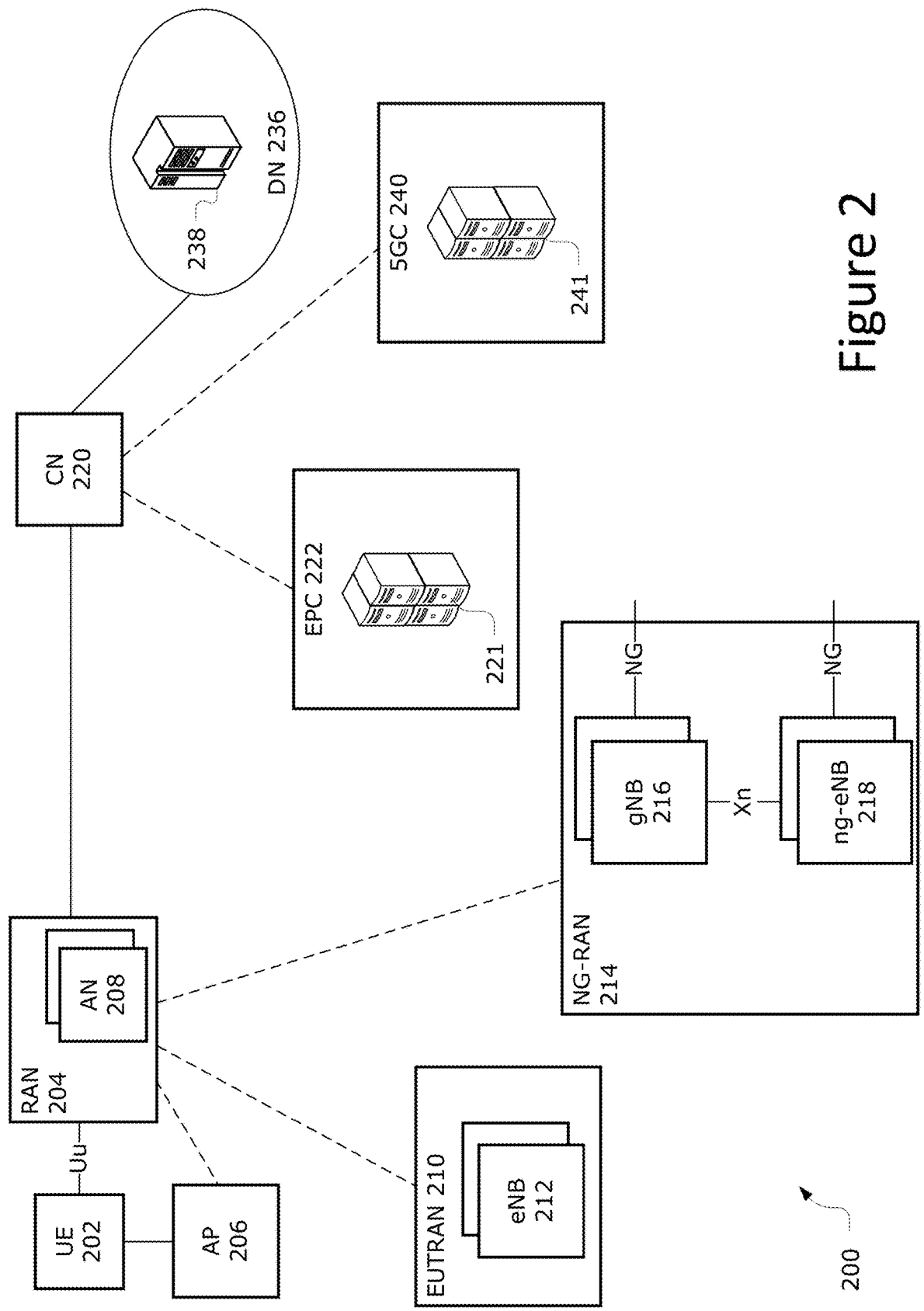
FIG. 2 illustrates an example network architecture according to various embodiments.

FIG. 2 illustrates a network 200 in accordance with various embodiments. The network 200 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 200 includes a UE 202, which is any mobile or non-mobile computing device designed to communicate with a RAN 204 via an over-the-air connection. The UE 202 is communicatively coupled with the RAN 204 by a Uu interface, which may be applicable to both LTE and NR systems. Examples of the UE 202 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 200 may include a plurality of UEs 202 coupled directly with one another via a D2D, ProSe, PC5, and/or sidelink (SL) interface. These UEs 202 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 202 may additionally communicate with an AP 206 via an over-the-air (OTA) connection. The AP 206 manages a WLAN connection, which may serve to offload some/all network traffic from the RAN 204. The connection between the UE 202 and the AP 206 may be consistent with any IEEE 802.11 protocol. Additionally, the UE 202, RAN 204, and AP 206 may utilize cellular-WLAN aggregation/integration (e.g., LWA/LWIP). Cellular-WLAN aggregation may involve the UE 202 being configured by the RAN 204 to utilize both cellular radio resources and WLAN resources.

The RAN 204 includes one or more access network nodes (ANs) 208. The ANs 208 terminate air-interface(s) for the UE 202 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 208 enables data/voice connectivity between CN 220 and the UE 202. The ANs 208 may be a macrocell base station or a low power base station for providing femtocells, picocells or other like cells having smaller coverage areas, smaller user capacity, or higher bandwidth compared to macrocells; or some combination thereof. In these implementations, an AN 208 be referred to as a BS, gNB, RAN node, eNB, ng-eNB, NodeB, RSU, TRxP, etc.

One example implementation is a "CU/DU split" architecture where the ANs 208 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (2020 Jan. 9)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 208 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 204 is an LTE RAN or Evolved Universal Terrestrial Radio Access Network (E-UTRAN) 210) or an Xn interface (if the RAN 204 is a NG-RAN 214). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs 208 of the RAN 204. For example, the UE 202 and RAN 204 may use carrier aggregation (CA) to allow the UE 202 to connect with a plurality of component carriers, each corresponding to a PCell or SCell. A PCell is an MCG cell, operating on a primary frequency, in which the UE 202 performs an initial connection establishment procedure and/or initiates a connection re-establishment procedure. An SCell is a cell providing additional radio resources on top of a Special Cell (SpCell) when the UE 202 is configured with CA. In CA, two or more Component Carriers (CCs) are aggregated. The UE 202 may simultaneously receive or transmit on one or multiple CCs depending on its capabilities. A UE 202 with single timing advance capability for CA can simultaneously receive and/or transmit on multiple CCs corresponding to multiple serving cells sharing the same timing advance (multiple serving cells grouped in one timing advance group (TAG)). A UE 202 with multiple timing advance capability for CA can simultaneously receive and/or transmit on multiple CCs corresponding to multiple serving cells with different timing advances (multiple serving cells grouped in multiple TAGs). The NG-RAN 214 ensures that each TAG contains at least one serving cell; A non-CA capable UE 202 can receive on a single CC and transmit on a single CC corresponding to one serving cell only (one serving cell in one TAG). CA is supported for both contiguous and noncontiguous CCs. When CA is deployed frame timing and SFN are aligned across cells that can be aggregated, or an offset in multiples of slots between the PCell/PSCell and an SCell is configured to the UE 202. In some implementations, the maximum number of configured CCs for a UE 202 is 16 for DL and 16 for UL.

In Dual Connectivity (DC) scenarios, a first AN 208 may be a master node that provides a Master Cell Group (MCG) and a second AN 208 may be secondary node that provides an Secondary Cell Group (SCG). The first and second ANs 208 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 202 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 204 may be an E-UTRAN 210 with one or more eNBs 212. The E-UTRAN 210 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 204 may be an next generation (NG)-RAN 214 with one or more gNB 216 and/or on or more ng-eNB 218. The gNB 216 connects with 5G-enabled UEs 202 using a 5G NR interface. The gNB 216 connects with a 5GC 240 through an NG interface, which includes an N2 interface or an N3 interface. The ng-eNB 218 also connects with the 5GC 240 through an NG interface, but may connect with a UE 202 via the Uu interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF (e.g., N3 interface), and an NG control plane (NG-C) interface, which is a signaling interface between the nodes of the NG-RAN 214 and an AMF (e.g., N2 interface).

The NG-RAN 214 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

The UE 202 can be configured to communicate using OFDM communication signals with other UEs 202 or with any of the AN 208 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

DL, UL, and SL transmissions are organized into frames with $T_f = (\Delta f_{max} N_f / 100) \cdot T_c = 10$ ms duration, each including ten subframes of $T_{sf} = (\Delta f_{max} N_f / 1000) \cdot T_c = 1$ ms duration. The number of consecutive OFDM symbols per subframe is $N_{symb}^{subframe,\mu} = N_{symb}^{slot} N_{slot}^{subframe,\mu}$ where $N_{symb}^{subframe,\mu}$ is the number of OFDM symbols per subframe for subcarrier spacing configuration μ (see e.g., clause 4.3.1 in 3GPP TS 38.211 v15.7.0 (2019 Sep. 28) ("[TS38211]"), $N_{symb}^{slot}$ is the number of symbols per slot, and $N_{slot}^{subframe,\mu}$ is the number of slots per subframe for subcarrier spacing configuration μ (see e.g., clause 4.3.2 in [TS38211]). Each frame is divided into two equally-sized half-frames of five subframes each with half-frame 0 consisting of subframes 0-4 and half-frame 1 consisting of subframes 5-9. There is one set of frames in the uplink and one set of frames in the downlink on a carrier. Uplink frame number i for transmission from the UE shall start $T_{TA} = (N_{TA} + N_{TA,offset}) T_c$ before the start of the corresponding downlink frame at the UE where $N_{TA,offset}$ is given by 3GPP TS 38.213 v15.7.0 (2019 Sep. 28) ("[TS38213]"), except for msgA transmission on the Physical Uplink Control Channel (PUSCH) where $N_{TA} = 0$ is used.

There is one resource grid (also referred to as a time-frequency grid or the like) for a given antenna port p, subcarrier spacing (SCS) configuration μ, and transmission direction (e.g., DL, UL, or SL). For each numerology and carrier, a resource grid of $N_{grid}^{size,\mu} N_{sc}^{RB}$ subcarriers and $N_{symb}^{subframe,\mu}$ OFDM symbols is defined, starting at common resource block (RB) $N_{grid}^{start,\mu}$ indicated by higher-layer signalling. An RB is defined as $N_{sc}^{RB} = 12$ consecutive subcarriers in the frequency domain.

Each element in the resource grid for antenna port p and SCS configuration μ is called a resource element (RE) and is uniquely identified by $(k,l)_{p,\mu}$ where k is the index in the frequency domain and l refers to the symbol position in the time domain relative to some reference point. RE $(k,l)_{p,\mu}$ corresponds to a physical resource and the complex value $a_{k,l}^{(p,\mu)}$. When no particular antenna port or SCS is specified, the indices p and μ may be dropped, resulting in $a_{k,l}^{(p)}$ or $a_{k,l}$. Each resource grid comprises a number of RBs, which describe the mapping of certain physical channels to REs.

Additionally, each RB comprises a collection of REs. An RE represents the smallest time-frequency unit in a resource grid.

Physical resource blocks (PRBs) for SCS configuration $\mu$ are defined within a bandwidth part (BWP) and numbered from 0 to $N_{BWP,i}^{size,\mu}-1$ where i is the number of the BWP. The relation between the physical resource block $n_{PRB}^{\mu}$ in BWP i and the common resource block $n_{CRB}^{\mu}$ is given by $n_{CRB}^{\mu}=n_{PRB}^{\mu}+N_{BWP,i}^{start,\mu}$ where $N_{BWP,i}^{start,\mu}$ is the common resource block where BWP i starts relative to common i resource block 0. Virtual resource blocks (VRBs) are defined within a BWP and numbered from 0 to $N_{BWP,i}^{size}-1$ where i is the number of the BWP.

An antenna port is defined such that a channel over which a symbol on the antenna port is conveyed can be inferred from the channel over which another symbol on the same antenna port is conveyed. For DMRS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG (see e.g., clause 5.1.2.3 of 3GPP TS 38.214 v15.7.0 (2019 Sep. 28) ("[TS38214]"). For DMRS associated with a PDCCH, the channel over which a PDCCH symbol on one antenna port is conveyed can be inferred from the channel over which a DMRS symbol on the same antenna port is conveyed only if the two symbols are within resources for which the UE may assume the same precoding being used (see e.g., clause 7.3.2.2 of [TS38211]). For DM-RS associated with a PBCH, the channel over which a PBCH symbol on one antenna port is conveyed can be inferred from the channel over which a DM-RS symbol on the same antenna port is conveyed only if the two symbols are within a SSB transmitted within the same slot, and with the same block index (see e.g., clause 7.4.3.1 of [TS38211]). Two antenna ports are said to be quasi co-located (QCL'd) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The DL transmission scheme includes, inter alia, a closed loop DMRS based spatial multiplexing is supported for PDSCH. In some implementations, up to 8 and 12 orthogonal DL DMRS ports are supported for type 1 and type 2 DMRS respectively. In some implementations, up to 8 orthogonal DL DMRS ports per UE 202 are supported for single user (SU)-multiple input multiple output (MIMO) and up to 4 orthogonal DL DMRS ports per UE are supported for multi-user (MU)-MIMO. The number of SU-MIMO code words is one for 1-4 layer transmissions and two for 5-8 layer transmissions. The DMRS and corresponding PDSCH are transmitted using the same precoding matrix and the UE 202 does not need to know the precoding matrix to demodulate the transmission. The transmitter may use different precoder matrix for different parts of the transmission bandwidth, resulting in frequency selective precoding. The UE 202 may also assume that the same precoding matrix is used across a set of PRBs, which is denoted as a Precoding Resource Block Group (PRG). Transmission durations from 2 to 14 symbols in a slot is supported, and aggregation of multiple slots with Transport Block (TB) repetition is supported.

Data and control streams from/to the MAC layer are encoded/decoded to offer transport and control services over the radio transmission link. A channel coding scheme is a combination of error detection, error correcting, rate matching, interleaving and transport channel or control information mapping onto/splitting from physical channels.

The PHY layer processing for the PDSCH and/or PHY layer processing of transport channels includes the following steps: transport block CRC attachment; code block segmentation and code block CRC attachment; channel coding (e.g., LDPC coding); PHY layer HARQ processing; rate matching; scrambling; modulation (e.g., QPSK, 16QAM, 64QAM and 256QAM); layer mapping; and mapping to assigned resources and antenna ports. The UE 202 may assume that at least one symbol with demodulation reference signal is present on each layer in which PDSCH is transmitted to the UE 202, and up to 3 additional DMRS can be configured by higher layers. Rate matching means that bits on a transport channel (TrCH) are repeated or punctured. Higher layers assign a rate-matching attribute for each TrCH. This attribute is semi-static and can only be changed through higher layer signalling. The rate-matching attribute is used when the number of bits to be repeated or punctured is calculated. Various aspects of rate matching are discussed in 3GPP TS 25.213 v15.0.0 (2018 Jun. 26) and 3GPP TS 38.212 v15.7.0 (2019 Sep. 28).

Additionally, the PDCCH can be used to schedule DL transmissions on PDSCH and UL transmissions on PUSCH, where the Downlink Control Information (DCI) on PDCCH includes: DL assignments containing at least modulation and coding format, resource allocation, and HARQ information related to DL shared channel (DL-SCH), and UL scheduling grants containing at least modulation and coding format, resource allocation, and HARQ information related to UL shared channel (UL-SCH). The UE 202 monitors a set of PDCCH candidates in configured monitoring occasions in one or more configured Control Resource Sets (CORESETs) according to corresponding search space configurations. A CORESET includes a set of PRBs with a time duration of 1 to 3 OFDM symbols. The resource units Resource Element Groups (REGs) and Control Channel Elements (CCEs) are defined within a CORESET with each CCE comprising a set of REGs. Control channels are formed by aggregation of CCE(s). Different code rates for the control channels are realized by aggregating different number of CCEs. Interleaved and non-interleaved CCE-to-REG mapping are supported in a CORESET. Polar coding and QPSK modulation is used for PDCCH. Each REG carrying PDCCH carries its own DMRS.

The 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (e.g., PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

A BWP is a subset of contiguous common resource blocks defined in clause 4.4.4.3 of [TS38211] or a given numerology $\mu_i$ in BWP i on a given carrier. The starting position $N_{BWP,i}^{start,\mu}$ and the number of RBs $N_{BWP,i}^{size,\mu}$ in a BWP fulfils $N_{grid,x}^{start,\mu} \leq N_{BWP,i}^{start,\mu} < N_{grid,x}^{start,\mu} + N_{grid,x}^{start,\mu}$ and $N_{grid,x}^{start,\mu} < N_{RWP,i}^{size,\mu} + N_{BWP,i}^{size,\mu} \leq N_{grid,x}^{start,\mu} + N_{grid,x}^{start,\mu}$, respectively. Configuration of a BWP is described in clause 12 of [TS38213]. The UE 202 can be configured with up to four BWPs in the downlink with a single downlink BWP being active at a given time. The UE is not expected to receive PDSCH, PDCCH, or CSI-RS (except for RRM) outside an active BWP. The UE 202 can be configured with up to four BWPs in the uplink with a single uplink BWP being active at a given time. If the UE 202 is configured with a supplementary uplink, the UE 202 can in addition be configured with up to four BWPs in the supplementary uplink with a single supplementary uplink BWP being active at a given time. The UE 202 does not transmit PUSCH or PUCCH outside an active BWP. For an active cell, UE 202 does not transmit SRS outside an active BWP.

The RAN 204 is communicatively coupled to CN 220, which includes network elements and/or network functions (NFs) to provide various functions to support data and telecommunications services to customers/subscribers (e.g., UE 202). The network elements and/or NFs may be implemented by one or more servers 221, 241. The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

The CN 220 may be an LTE CN 222 (also referred to as an Evolved Packet Core (EPC) 222). The EPC 222 may include MME, SGW, SGSN, HSS, PGW, PCRF, and/or other NFs coupled with one another over various interfaces (or "reference points") (not shown). The CN 220 may be a 5GC 240 including an AUSF, AMF, SMF, UPF, NSSF, NEF, NRF, PCF, UDM, AF, and/or other NFs coupled with one another over various service-based interfaces and/or reference points. The 5GC 240 may enable edge computing by selecting operator/3rd party services to be geographically close to a point that the UE 202 is attached to the network. This may reduce latency and load on the network. In edge computing implementations, the 5GC 240 may select a UPF close to the UE 202 and execute traffic steering from the UPF to DN 236 via the N6 interface. This may be based on the UE subscription data, UE location, and information provided by the AF, which allows the AF to influence UPF (re)selection and traffic routing.

The data network (DN) 236 may represent various network operator services, Internet access, or third party services that may be provided by one or more servers including, for example, application (app)/content server 238. The DN 236 may be an operator external public, a private PDN, or an intra-operator packet data network, for example, for provision of IMS services. In this embodiment, the server 238 can be coupled to an IMS via an S-CSCF or the I-CSCF. In some implementations, the DN 236 may represent one or more local area DNs (LADNs), which are DNs 236 (or DN names (DNNs)) that is/are accessible by a UE 202 in one or more specific areas. Outside of these specific areas, the UE 202 is not able to access the LADN/DN 236.

Additionally or alternatively, the DN 236 may be an Edge DN 236, which is a (local) Data Network that supports the architecture for enabling edge applications. In these embodiments, the app server 238 may represent the physical hardware systems/devices providing app server functionality and/or the application software resident in the cloud or at an edge compute node that performs server function(s). In some embodiments, the app/content server 238 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 210, 214. For example, the edge compute nodes can provide a connection between the RAN 214 and UPF in the 5GC 240. The edge compute nodes can use one or more NFV instances instantiated on virtualization infrastructure within the edge compute nodes to process wireless connections to and from the RAN 214 and a UPF.

In some implementations, the system 200 may include an SMSF, which is responsible for SMS subscription checking and verification, and relaying SM messages to/from the UE 202 to/from other entities, such as an SMS-GMSC/IWMSC/SMS-router. The SMS may also interact with AMF and UDM for a notification procedure that the UE 202 is available for SMS transfer (e.g., set a UE not reachable flag, and notifying UDM when UE 202 is available for SMS).

1. Beam Management Aspects

As alluded to previously, the UE 202 may be configured for beam management, where the UE 202 measures one or more beams of a cell and the measurement results (e.g., power values) are averaged to derive cell quality. In doing so, the UE 202 is configured to consider a subset of the detected beams, such as the Xbest beams above an absolute threshold (where Xis a number). Filtering takes place at two different levels: at the PHY layer to derive beam quality and then at the RRC level to derive cell quality from multiple beams. Cell quality from beam measurements is derived in the same way for the serving cell(s) and for the non-serving cell(s). Measurement reports may contain the measurement results of the Xbest beams if the UE 202 is configured to do so by the gNB 216 (where X is a number).

The UE 202 derives cell measurement results by measuring one or multiple beams per cell as configured by the network. For all cell measurement results, the UE 202 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.4.0 (2019 Sep. 28) ("[TS36214]"), 3GPP TS 38.215 v15.5.0 (2019 Jun. 24) ("[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) ("[IEEE80211]"), and/or the like.

The DL radio link quality (RLQ) of the primary cell is monitored by a UE 202 for the purpose of indicating out-of-sync/in-sync status to higher layers. The UE 202 is not required to monitor the DL RLQ in DL BWPs other than the active DL BWP, as described in Clause 12 of [TS38213], on the primary cell. If the active DL BWP is the initial DL BWP and for SS/PBCH block and CORESET multiplexing pattern 2 or 3, as described in Clause 13 of [TS38213], the UE 202 is expected to perform RLM using the associated SS/PBCH block when the associated SS/PBCH block index is provided by RadioLinkMonitoringRS.

If the UE 202 is configured with a SCG, as described in 3GPP TS 38.331 v15.7.0 (2019 Sep. 27), and the parameter rlf-TimersAndConstants is provided by higher layers and is not set to release, the DL RLQ of the PSCell of the SCG is monitored by the UE 202 for the purpose of indicating out-of-sync/in-sync status to higher layers. The UE 202 is not required to monitor the DL RLQ in DL BWPs other than the active DL BWP on the PSCell.

A UE 202 can be configured for each DL BWP of a SpCell [TS38321] with a set of resource indexes, through a corresponding set of RadioLinkMonitoringRS, for radio link monitoring (RLM) by failureDetectionResources. The UE 202 is provided either a CSI-RS resource configuration index, by csi-RS-Index, or a SS/PBCH block index, by ssb-Index. The UE 202 can be configured with up to $N_{LR-RLM}$ RadioLinkMonitoringRS for link recovery procedures, as described in Clause 6, and for RLM. From the $N_{LR-RLM}$ RadioLinkMonitoringRS, up to $N_{RLM}$ RadioLinkMonitoringRS can be used for RLM depending on $L_{max}$ as described in Table 5-1, wherein $L_{max}$ is as defined in Clause 4.1 of [TS38213], and up to two RadioLinkMonitoringRS can be used for link recovery procedures.

For operation with shared spectrum channel access, when a UE 202 is provided a SS/PBCH block index by ssb-Index, the UE 202 is expected to perform RLM using SS/PBCH block(s) in the discovery burst transmission window as described in Clause 4.1, where the SS/PBCH block(s) have candidate SS/PBCH block index(es) corresponding to SS/PBCH block index provided by ssb-Index.

If the UE 202 is not provided RadioLinkMonitoringRS and the UE 202 is provided for PDCCH receptions TCI states that include one or more of a CSI-RS, the UE 202 uses for RLM the RS provided for the active TCI state for PDCCH reception if the active TCI state for PDCCH reception includes only one RS. If the active TCI state for PDCCH reception includes two RS, the UE 202 expects that one RS has QCL-TypeD [TS38214] and the UE 202 uses the RS with QCL-TypeD for RLM; the UE 202 does not expect both RS to have QCL-TypeD. The UE 202 is not required to use for RLM an aperiodic or semi-persistent RS. For $L_{max}$=4, the UE 202 selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE 202 determines the order of the CORESET from the highest CORESET index as described in Clause 10.1 of [TS38213].

A UE 202 does not expect to use more than $N_{RLM}$ RadioLinkMonitoringRS for RLM when the UE 202 is not provided RadioLinkMonitoringRS. Values of $N_{LR-RLM}$ and $N_{RLM}$ for different values of $L_{max}$ are given in Table 5-1.

TABLE 5-1

$N_{LR-RLM}$ and $N_{RLM}$ as a function of maximum number $L_{max}$ of SSBs per half frame

| $L_{max}$ | $N_{LR-RLM}$ | $N_{RLM}$ |
| --- | --- | --- |
| 4 | 2 | 2 |
| 8 | 6 | 4 |
| 64 | 8 | 8 |

For a CSI-RS resource configuration, powerControlOffsetSS is not applicable and a UE 202 expects to be provided only 'noCDM' from cdm-Type, only 'one' and 'three' from density, and only '1 port' from nrofPorts [TS38214].

If a UE 202 is configured with multiple DL BWPs for a serving cell, the UE 202 performs RLM using the RS(s) corresponding to resource indexes provided by RadioLinkMonitoringRS for the active DL BWP or, if RadioLinkMonitoringRS is not provided for the active DL BWP, using the RS(s) provided for the active TCI state for PDCCH receptions in CORESETs on the active DL BWP.

In non-DRX mode operation, the physical layer in the UE 202 assesses once per indication period the RLQ, evaluated over the previous time period defined in [TS38133] against thresholds ($Q_{out}$ and $Q_{in}$) configured by rlmInSyncOutOfSyncThreshold. The UE 202 determines the indication period as the maximum between the shortest periodicity for RLM resources and 10 msec.

In DRX mode operation, the physical layer in the UE 202 assesses once per indication period the RLQ, evaluated over the previous time period defined in [TS38133], against thresholds ($Q_{out}$ and $Q_{in}$) provided by rlmInSyncOutOfSyncThreshold. The UE 202 determines the indication period as the maximum between the shortest periodicity for RLM resources and the DRX period.

The physical layer in the UE 202 indicates, in frames where the RLQ is assessed, out-of-sync to higher layers when the RLQ is worse than the threshold $Q_{out}$ for all resources in the set of resources for RLM. When the RLQ is better than the threshold $Q_{in}$ for any resource in the set of resources for RLM, the physical layer in the UE 202 indicates, in frames where the RLQ is assessed, in-sync to higher layers.

The network may also configure the UE 202 to report measurement information per beam, which can either be measurement results per beam with respective beam identifier(s) or only beam identifier(s)). If beam measurement information is configured to be included in measurement reports, the UE 202 applies the L3 beam filtering. However, the exact L1 filtering of beam measurements used to derive cell measurement results is implementation dependent. For channel state estimation purposes, the UE 202 may be configured to measure CSI-RS resources and estimate a DL channel state based on the CSI-RS measurements. The UE 202 feeds the estimated channel state back to the AN 208 (e.g., gNB 216) to be used in link adaptation.

For beam failure detection (BFD), the AN 208 (e.g., gNB 216) configures the UE 202 with BFD reference signals and the UE 202 declares a beam failure when a number of beam failure instance indications from the PHY layer reaches a configured threshold before a configured timer expires. In particular, a beam failure is detected by counting the number beam failure instance indications from the lower layers to the MAC entity in the UE 202. Each time instant a measured beam is below a configured value is defined as a beam failure instance. If the number of consecutive beam failure instances exceeds a configured value, the device declares a beam failure and initiates the beam-failure-recovery procedure. The BFD reference signals may be SSB or CSI-RS. SSB-based BFD is based on the SSB associated with the initial DL BWP and can only be configured for the initial DL BWPs and for DL BWPs containing the SSB associated to the initial DL BWP. For other DL BWPs, BFD can only be performed based on CSI-RS.

A beam failure is assumed to have happened when the error probability for the PDCCH exceeds a certain value. However, similar to radio link failure (RLFs), rather than actually measuring the PDCCH error probability, the UE 202 declares a beam failure based on quality measurements of the configured BFD reference signals (RSs). In particular, the UE 202 may declare a beam failure based on measured L1-RSRP of a periodic CSI-RS or SSB that is spatially QCL'd with the PDCCH. In some implementations, the UE 202 may declare beam failure based on measurement on the BFD RSs (e.g., CSI-RS or SSB) associated with the PDCCH Transmission Configuration Indicator (TCI) state. In other implementations, the UE 202 may be explicitly configured to measure a different CSI-RS or SSB for BFD.

After beam failure is detected, the UE 202 triggers beam failure recovery by initiating a RA procedure on the PCell, and selecting a suitable beam to perform beam failure recovery (e.g., if the gNB 216 has provided dedicated RA resources for certain beams, those will be prioritized by the UE 202). Upon completion of the RA procedure, beam failure recovery is considered complete.

More specifically, the UE 202 can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or SS/PBCH block (SSB) indexes by candidateBeamRSList, candidateBeamRSListExt-r16, or candidateBeamRSSCellList-r16 for RLQ measurements on the BWP of the serving cell. For example, the parameter candidateBeamRSList includes a list of reference signals (e.g., CSI-RS and/or SSB) identifying the candidate beams for recovery and the associated RA parameters. If the UE 202 is not provided $\bar{q}_0$ by failureDetectionResources or beamFailureDetectionResourceList for a BWP of the serving cell, the UE 202 determines the set $\bar{q}_0$ to include periodic CSI-RS resource configuration indexes with same values as the RS indexes in the RS sets indicated by TCI-State for respective Control Resource Sets (CORESETs) that the UE 202 uses for monitoring PDCCH, and if there are two RS indexes in a TCI state, the set $\bar{q}_0$ includes RS indexes with QCL-TypeD configuration for the corresponding TCI states. The UE 202 expects the set $\bar{q}_0$ to include up to two RS indexes. The UE 202 expects single port RS in the set $\bar{q}_0$. The UE 202 expects single-port or two-port CSI-RS with frequency density equal to 1 or 3 resource elements (REs) per resource block (RB) in the set $\bar{q}_1$.

The thresholds $Q_{out,LR}$ and $Q_{in,LR}$ correspond to the default value of rlmInSyncOutOfSyncThreshold, as described in 3GPP TS 38.133 v15.7.0 (2019 Oct. 7) ("[TS38133]") for $Q_{out}$, and to the value provided by rsrp-ThresholdSSB or rsrp-ThresholdBFR-r16, respectively.

RRC configures the parameter rsrp-ThresholdSSB, among many others, for an RA procedure. The parameter rsrp-ThresholdSSB is an RSRP threshold for the selection of the SSB for a 4-step RA type procedure. If the RA procedure is initiated for beam failure recovery, rsrp-ThresholdSSB used for the selection of the SSB within candidateBeamRSList refers to rsrp-ThresholdSSB in BeamFailureRecoveryConfig information element (IE). Other RRC configured RA parameters are discussed at section 5.1 of [TS38321].

The PHY layer in the UE 202 assesses the RLQ according to the set $\bar{q}_0$ of resource configurations against the threshold $Q_{out,LR}$. For the set $\bar{q}_0$, the UE 202 assesses the RLQ only according to periodic CSI-RS resource configurations, or SSBs on the PCell or the PSCell, that are QCL'd, as described in [TS38214], with the DM-RS of PDCCH receptions monitored by the UE. The UE 202 applies the $Q_{in,LR}$ threshold to the L1-RSRP measurement obtained from a SSB. The UE 202 applies the $Q_{in,LR}$ threshold to the L1-RSRP measurement obtained for a CSI-RS resource after scaling a respective CSI-RS reception power with a value provided by powerControlOffsetSS.

In non-DRX mode operation, the PHY layer in the UE 202 provides an indication to higher layers when the RLQ for all corresponding resource configurations in the set $\bar{q}_0$ that the UE 202 uses to assess the RLQ is worse than the threshold $Q_{out,LR}$. The physical layer informs the higher layers when the RLQ is worse than the threshold $Q_{out,LR}$ with a periodicity determined by the maximum between the shortest periodicity among the periodic CSI-RS configurations, and/or SSBs on the PCell or the PSCell, in the set $\bar{q}_0$ that the UE 202 uses to assess the RLQ and 2 msec. In DRX mode operation, the physical layer provides an indication to higher layers when the RLQ is worse than the threshold $Q_{out,LR}$ with a periodicity determined as described in [TS38133].

For the PCell or the PSCell, upon request from higher layers, the UE 202 provides to higher layers the periodic CSI-RS configuration indexes and/or SSB indexes from the set $\bar{q}_1$ and the corresponding L1-RSRP measurements that are larger than or equal to the $Q_{in,LR}$ threshold.

For the SCell, upon request from higher layers, the UE 202 indicates to higher layers whether there is at least one periodic CSI-RS configuration index and/or SSB index from the set $\bar{q}_1$ with corresponding L1-RSRP measurements that are larger than or equal to the $Q_{in,LR}$ threshold, and provides the periodic CSI-RS configuration indexes and/or SSB indexes from the set $\bar{q}_1$ and the corresponding L1-RSRP measurements that are larger than or equal to the $Q_{in,LR}$ threshold, if any. The SSB Index identifies an SSB within a Synchronization Signal (SS) Burst (see e.g., clause 4.1 of [TS38213]).

For the PCell or the PSCell, a UE 202 can be provided a CORESET through a link to a search space set provided by recoverySearchSpaceId, as described in Clause 10.1, for monitoring PDCCH in the CORESET. If the UE 202 is provided recoverySearchSpaceId, the UE 202 does not expect to be provided another search space set for monitoring PDCCH in the CORESET associated with the search space set provided by recoverySearchSpaceId.

For the PCell or the PSCell, the UE 202 can be provided, by PRACH-ResourceDedicatedBFR, a configuration for Physical Random Access Channel (PRACH) transmission as described in clause 8.1 of [TS38213]. For PRACH transmission in slot n and according to antenna port quasi co-location (QCL) parameters associated with periodic CSI-RS resource configuration or with SSB associated with index $\bar{q}_{new}$ provided by higher layers 3GPP TS 38.321 v15.7.0 (2019 Sep. 27) ("[TS38321]"), the UE 202 monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE 202 assumes the same antenna port quasi-collocation parameters as the ones associated with index $\bar{q}_{new}$ until the UE 202 receives by higher layers an activation for a TCI state or any of the parameters tci-StatesPDCCH-ToAddList and/or tci-StatesPDCCH-ToReleaseList. After the UE 202 detects a DCI format with CRC scrambled by C-RNTI or MCS-C-RNTI in the search space set provided by recoverySearchSpaceId, the UE 202 continues to monitor PDCCH candidates in the search space set provided by recoverySearchSpaceId until the UE 202 receives a MAC CE activation command for a TCI state or tci-StatesPDCCH-ToAddList and/or tci-StatesPDCCH-ToReleaseList.

For the PCell or the PSCell, after 28 symbols from a last symbol of a first PDCCH reception in a search space set provided by recoverySearchSpaceId for which the UE 202 detects a DCI format with CRC scrambled by C-RNTI or MCS-C-RNTI and until the UE 202 receives an activation command for PUCCH-SpatialRelationInfo [TS38321] or is provided PUCCH-SpatialRelationInfo for PUCCH resource(s), the UE 202 transmits a PUCCH on a same cell as the PRACH transmission using a same spatial filter as for the last PRACH transmission and/or a power determined as described in Clause 7.2.1 of [TS38213] with $\bar{q}_u=0$, $\bar{q}_d=\bar{q}_{new}$, and l=0.

For the PCell or the PSCell, after 28 symbols from a last symbol of a first PDCCH reception in a search space set provided by recoverySearchSpaceId where a UE 202 detects a DCI format with CRC scrambled by C-RNTI or MCS-C-RNTI, the UE 202 assumes same antenna port quasi-collocation parameters as the ones associated with index $\bar{q}_{new}$ for PDCCH monitoring in a CORESET with index 0.

The UE 202 can be provided, by schedulingRequestID-BFR-SCell-r16, a configuration for PUCCH transmission with a link recovery request (LRR) as described in clause 9.2.4 of [TS38213]. In particular, the UE 202 can be configured by schedulingRequestIDForBFR a configuration for LRR in a PUCCH transmission using either PUCCH format 0 or PUCCH format 1. The UE 202 may also be configured with a PUCCH resource by schedulingRequest-IDForBFR, providing a PUCCH format 0 resource or a PUCCH format 1 resource as described in clause 9.2.1 of [TS38213]. The UE 202 is also configured with a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the UE determines a SR transmission occasion in a PUCCH to be in a slot with number $n_{s,f}^\mu$ (see e.g., [TS38211]) in a frame with number $n_f$ if $(n_f \cdot N_{slot}^{frame,\mu}+n_{s,f}^\mu-SR_{OFFSET})$ mod $SR_{PERIODICITY}=0$. If $SR_{PERIODICITY}$ is one slot, the UE 202 expects that $SR_{OFFSET}=0$ and every slot is a SR transmission occasion in a PUCCH. If $SR_{PERIODICITY}$ is smaller than one slot, the UE 202 determines an SR transmission occasion in a PUCCH to start in a symbol with index l (see e.g., [TS38211]) if $(l-l_0 \mod SR_{PERIODICITY})$mod $SR_{PERIODICITY}=0$ where $l_0$ is the value of startingSymbolIndex.

The UE 202 can transmit in a first PUSCH MAC Control Element (CE) providing index(es) for at least corresponding SCell(s) with RLQ worse than $Q_{out,LR}$, indication(s) of presence of $q_{new}$ for corresponding SCell(s), and index(es) $q_{new}$ for a periodic CSI-RS configuration or for a SSB provided by higher layers, as described in [TS38321], if any, for corresponding SCell(s).

After 28 symbols from a last symbol of a PDCCH reception with a DCI format scheduling a PUSCH transmission with a same Hybrid Automatic Repeat Request (HARQ) process number as for the transmission of the first PUSCH and having a toggled NDI field value, the UE 202 monitors PDCCH in all CORESETs on the SCell(s) indicated by the MAC CE using the same antenna port QCL parameters as the ones associated with the corresponding index(es) $q_{new}$, if any. Then, the UE 202 transmits PUCCH on a PUCCH-SCell using a same spatial domain filter as the one corresponding to $q_{new}$ for periodic CSI-RS or SSB reception, as described in clause 9.2.2 of [TS38213], and using a power determined as described in clause 7.2.1 of [TS38213] with $q_u=0$, $q_d=q_{new}$, and l=0, if the UE 202 is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC CE. The SCS configuration for the 28 symbols is the smallest of the SCS configurations of the active DL BWP for the PDCCH reception and of the active DL BWP(s) of the at least one SCell.

Figure 3:
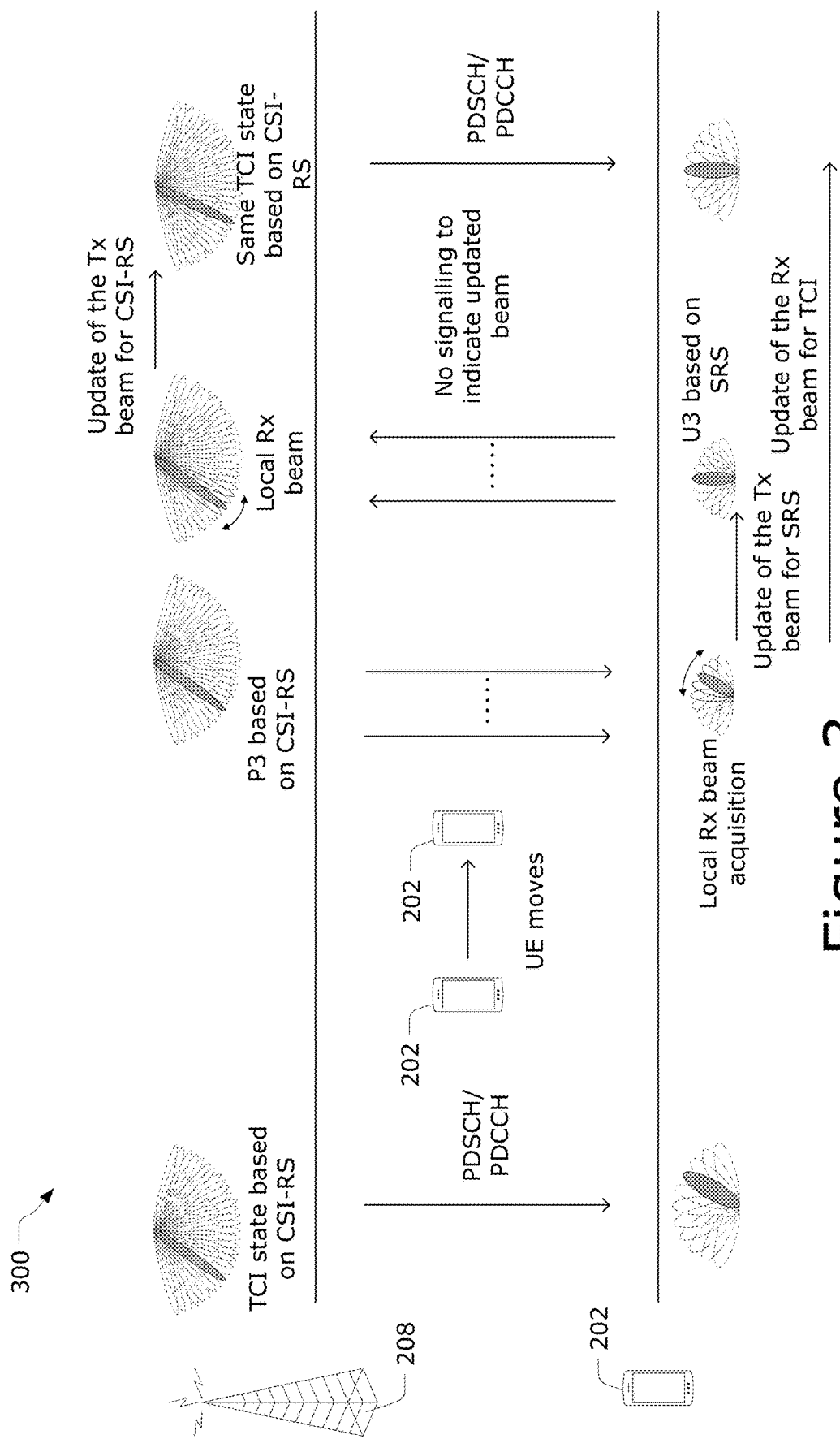
FIG. 3 illustrates an example of new beam indication using flexible Tx beam-forming assignment according to various embodiments.

According to various embodiments, the Tx beam-forming on the reference signal included in TCI state that is configured for the physical DL channel (e.g., PDCCH or PDSCH) or other DL reference signal (e.g., CSI-RS for CSI, tracking reference signal (TRS)) can be updated by gNB 216. A new Tx beamforming can be obtained by gNB 216 from the measurements of the associated uplink reference signals (e.g. SRS) or based on the reported by Tx beam, where the reported Tx beam corresponds to the ID of the DL reference signal transmitted by the UE in the physical uplink control channel. To accommodate decoding and application of the reported Tx beam, the UE 202 may assume a new Tx beam applied after K symbols relative to the last symbol of physical uplink control channel. When the Tx beam-forming is updated using UL measurements, the uplink reference signal transmission (e.g., SRS) should be performed with repetitions with the same Tx beamforming assignment. Such uplink reference signal transmission allows Rx beam-forming refinement at gNB 216 for subsequent application of the acquired Rx beam for Tx beamforming for DL transmissions as shown by FIG. 3. FIG. 3 illustrates an example 300 of new beam indication using flexible Tx beam-forming assignment according to various embodiments.

Similarly, transmission beam-forming on the reference signal included in spatial relation information configured for the physical uplink channel (e.g., PUCCH or PUSCH) or other uplink reference signal (e.g., SRS) can be updated by UE based on the measurements of the DL reference signals (e.g. CSI-RS) or based on the reported Tx beam in the physical DL control channel. Similar to DL case, the new Tx beam indicated in DCI should be applied after K symbols relative to the last symbol of physical DL control channel. When the Tx beam-forming is updated using DL measurements, the DL reference signal transmission (e.g., CSI-RS) should be performed with repetitions with the same Tx beamforming assignment. Such DL reference signal transmission allows Rx beam-forming refinement at UE for subsequent application of the acquired Rx beam for Tx beamforming for UL transmissions as shown in FIG. 3.

Figure 4:
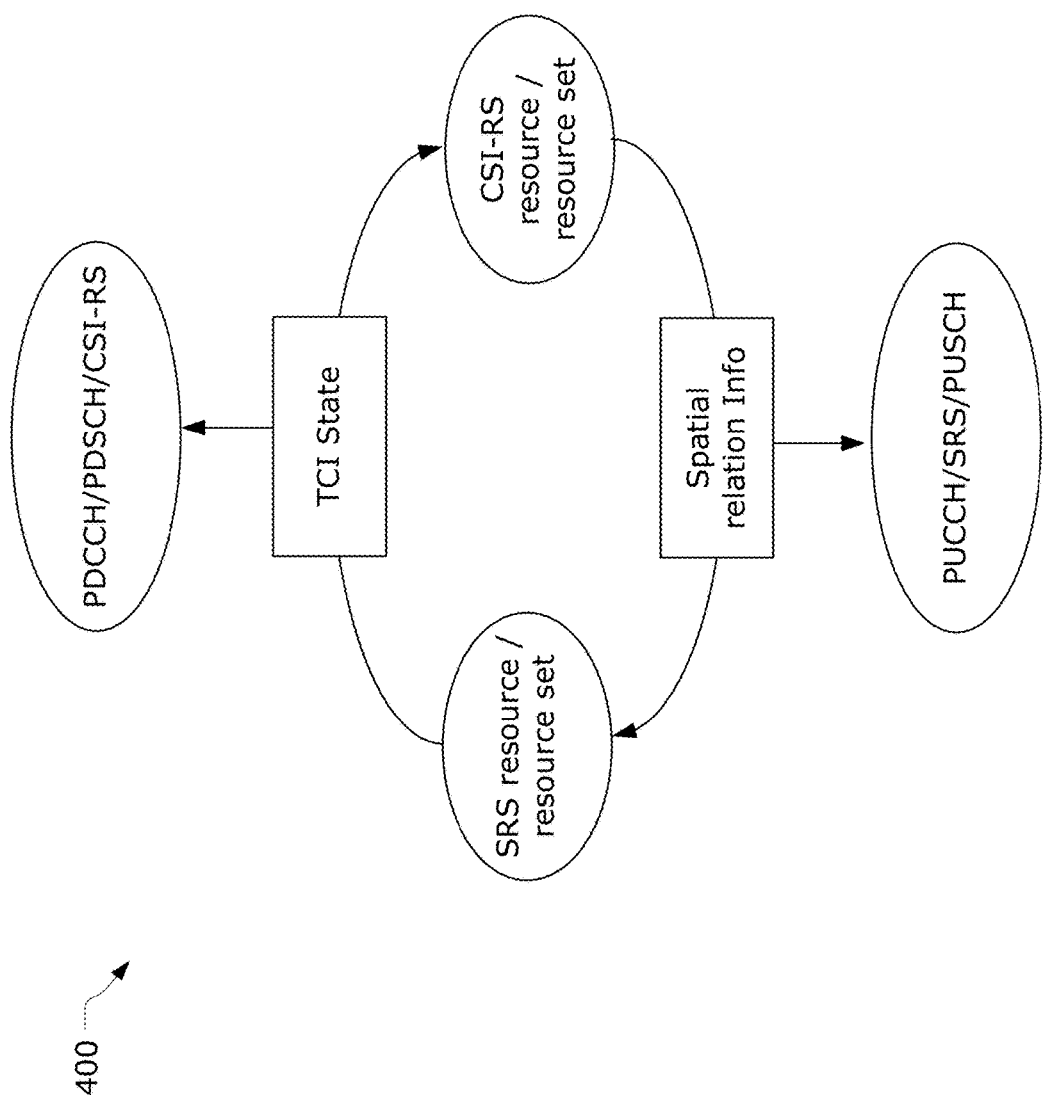
FIG. 4 illustrates an example of association between SRS and CSI-RS to facilitate flexible Tx beamforming assignment according to various embodiments.

The above procedure can be realized by different signalling options indicating corresponding associations. For example, one SRS resource set (or SRS resource) and one CSI-RS resource set (or CSI-RS resource) may be configured with the corresponding CSI-RS resource set (CSI-RS resource) and SRS resource set (or SRS resource) respectively, as shown in FIG. 4. FIG. 4 illustrates an example 400 association between SRS and CSI-RS to facilitate flexible Tx beamforming assignment according to various embodiments. Such mutual association indicates a flexible Tx beam-forming assignment at both ends based on acquired Rx beams for both DL and UL directions.

In other embodiments, other indications of flexible beam-forming can be used. For example, QCL measurement restrictions can be configured for CSI-RS resource or CSI-RS resource set to indicate flexible assignment of the transmission beam in DL. Similar the time restricted spatial relation can be configured for SRS resource or SRS resource set to indicate flexible assignment of the transmission beam in UL.

2. Hardware Systems and Configurations

Figure 5:
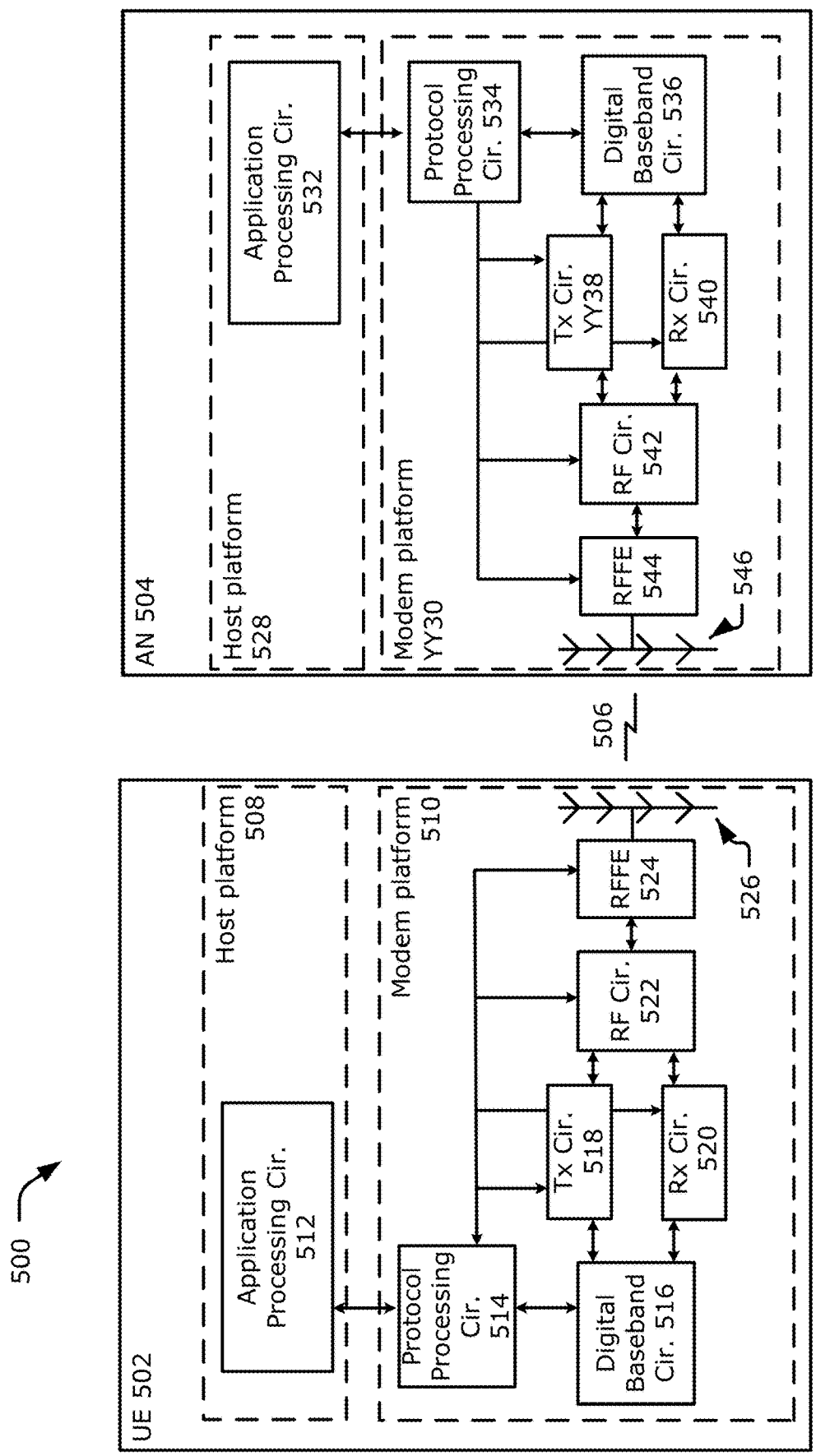
FIG. 5 schematically illustrates a wireless network in accordance with various embodiments.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection YY06 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ acknowledgement (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE 502 reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE 502 transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and DL dynamic radio resource management, and data packet scheduling.

Figure 6:
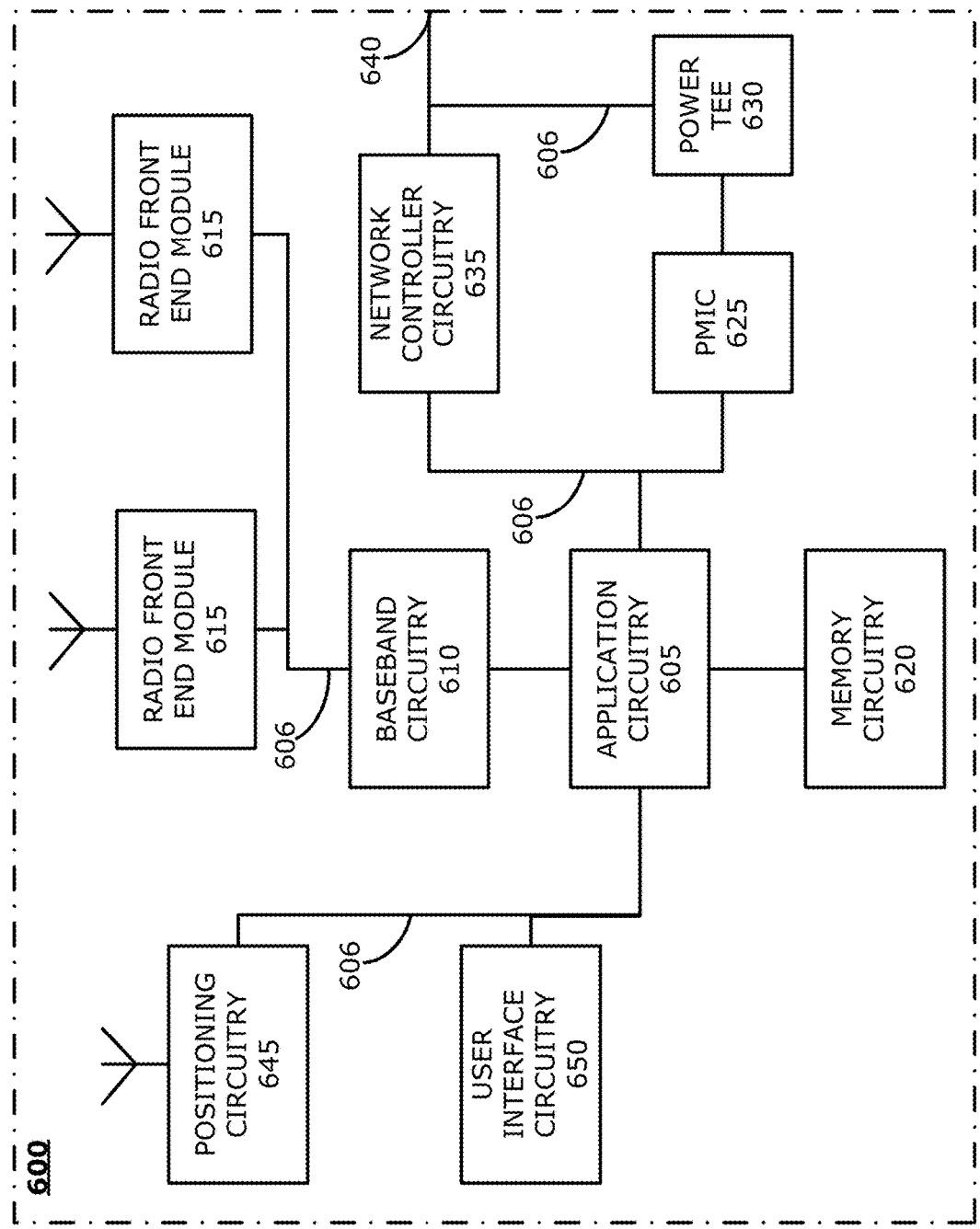
FIG. 6 illustrates an example of infrastructure equipment in accordance with various embodiments.

FIG. 6 illustrates an example of infrastructure equipment 600 in accordance with various embodiments. The infrastructure equipment 600 (or "system 600") may be implemented as a base station, radio head, access network node, and/or any other element/device discussed herein. In other examples, the system 600 could be implemented in or by an intermediate node 1220 or endpoint 1210.

The system 600 includes application circuitry 605, baseband circuitry 610, one or more RFEMs 615, memory circuitry 620, PMIC 625, power tee circuitry 630, network controller circuitry 635, network interface connector 640, positioning circuitry 645, and user interface 650. In some embodiments, the device 600 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 605 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 600 may not utilize application circuitry 605, and instead may include a special-purpose processor/controller to process IP data received from an EPC or 5GC, for example.

In some implementations, the application circuitry 605 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices (PLDs) such as CPLDs, HCPLDs, and the like; ASICs such as structured ASICs and the like; programmable SoCs; and/or the like. In such implementations, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 605 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 610 may be implemented, for example, as a solder-down substrate including one or more integrated circuits, a single packaged integrated circuit soldered to a main circuit board or a multi-chip module containing two or more integrated circuits. The baseband circuitry 610 includes one or more processing devices (e.g., baseband processors) to carry out various protocol and radio control functions. Baseband circuitry 610 may interface with application circuitry of system 600 for generation and processing of baseband signals and for controlling operations of the RFEMs 615. The baseband circuitry 610 may handle various radio control functions that enable communication with one or more radio networks via the RFEMs 615. The baseband circuitry 610 may include circuitry such as, but not limited to, one or more single-core or multi-core processors (e.g., one or more baseband processors) or control logic to process baseband signals received from a receive signal path of the RFEMs 615, and to generate baseband signals to be provided to the RFEMs 615 via a transmit signal path. In various embodiments, the baseband circuitry 610 may implement a RTOS to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 6, in one embodiment, the baseband circuitry 610 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 615 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 615 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 610 and/or RFEMs 615. The baseband circuitry 610 may also support radio communications for more than one wireless protocol.

Continuing with the aforementioned embodiment, the baseband circuitry 610 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 615, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 620 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 620 may be implemented as one or more of solder down packaged integrated circuits, socketed memory modules and plug-in memory cards. The memory circuitry 620 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 600, an operating system of infrastructure equipment 600, one or more applications, and/or for carrying out the embodiments discussed herein. The computational logic may be stored or loaded into memory circuitry 620 as instructions for execution by the processors of the application circuitry 605 to provide or perform the functions described herein. The various elements may be implemented by assembler instructions supported by processors of the application circuitry 605 or high-level languages that may be compiled into such instructions. The permanent copy of the programming instructions may be placed into persistent storage devices of memory circuitry 620 in the factory during manufacture, or in the field through, for example, a distribution medium (not shown), through a communication interface (e.g., from a distribution server), and/or OTA.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols. In various embodiments, the network controller circuitry 635 enables communication with associated equipment and/or with a backend system (e.g., server(s) 1230 of FIG. 12), which may take place via a suitable gateway device.

The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various other infrastructure equipment, or the like.

The components shown by FIG. 6 may communicate with one another using interface circuitry 606 or IX 606, which may include any number of bus and/or IX technologies such as ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 7:
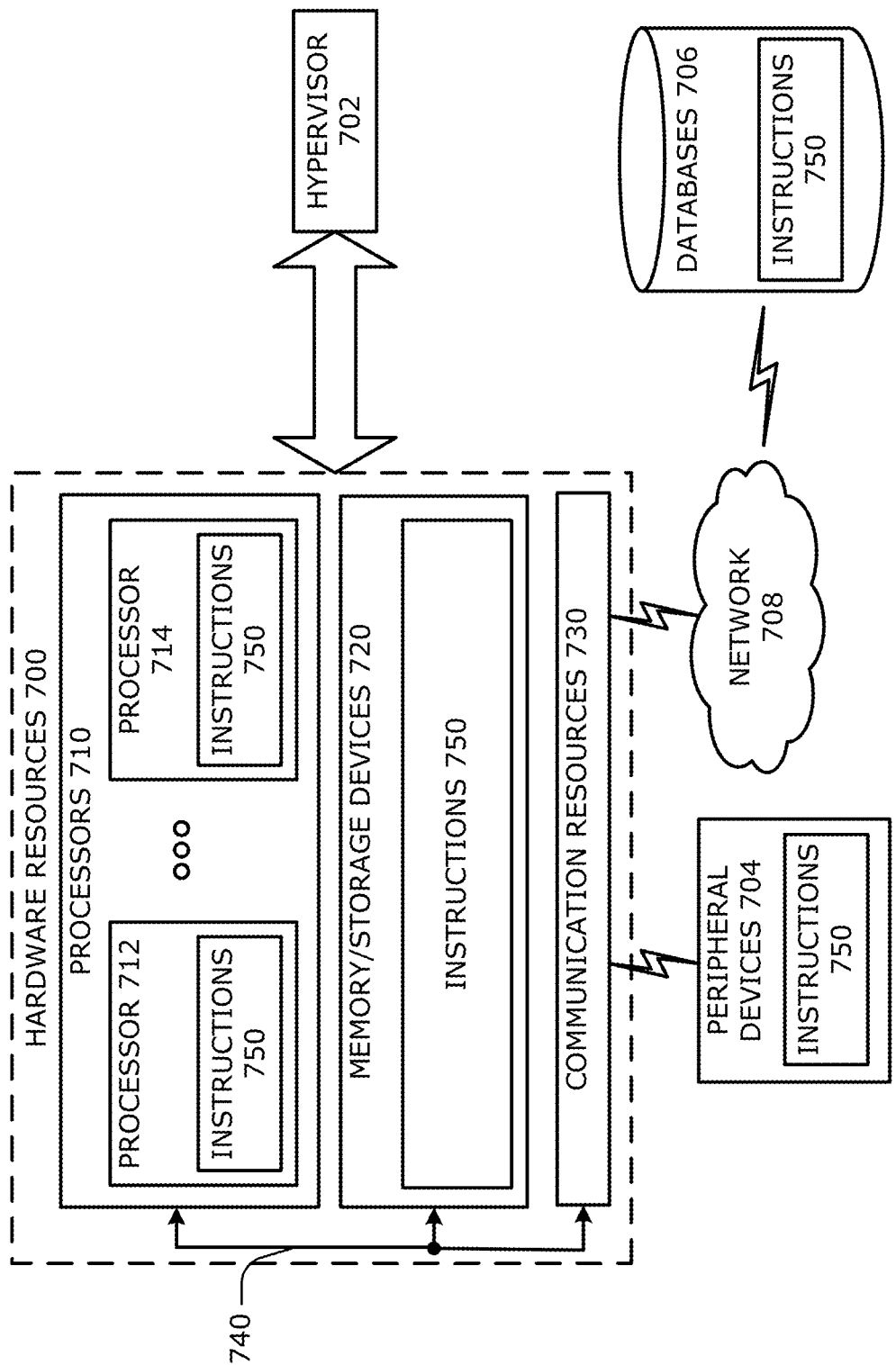
FIG. 7 illustrates components of a computing device according to some example embodiments.

FIG. 7 illustrates components of a computing device 700 according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/sub-slices to utilize the hardware resources 700.

The processors 710 include, for example, processor 712 and processor 714. The processors 710 include circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processors 710 may be, for example, a central processing unit (CPU), reduced instruction set computing (RISC) processors, Acorn RISC Machine (ARM) processors, complex instruction set computing (CISC) processors, graphics processing units (GPUs), one or more Digital Signal Processors (DSPs) such as a baseband processor, Application-Specific Integrated Circuits (ASICs), an Field-Programmable Gate Array (FPGA), a radio-frequency integrated circuit (RFIC), one or more microprocessors or controllers, another processor (including those discussed herein), or any suitable combination thereof. In some implementations, the processor circuitry 710 may include one or more hardware accelerators, which may be microprocessors, programmable processing devices (e.g., FPGA, complex programmable logic devices (CPLDs), etc.), or the like.

The memory/storage devices 720 may include main memory, disk storage, or any suitable combination thereof. The memory/storage devices 720 may include, but are not limited to, any type of volatile, non-volatile, or semi-volatile memory such as random access memory (RAM), dynamic RAM (DRAM), static RAM (SRAM), synchronous DRAM (SDRAM), erasable programmable read-only memory (EPROM), electrically erasable programmable read-only memory (EEPROM), Flash memory, solid-state storage, phase change RAM (PRAM), resistive memory such as magnetoresistive random access memory (MRAM), etc., and may incorporate three-dimensional (3D) cross-point (XPOINT) memories from Intel® and Micron®. The memory/storage devices 720 may also comprise persistent storage devices, which may be temporal and/or persistent storage of any type, including, but not limited to, non-volatile memory, optical, magnetic, and/or solid state mass storage, and so forth.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, Ethernet, Ethernet over GRE Tunnels, Ethernet over Multi-protocol Label Switching (MPLS), Ethernet over USB, Controller Area Network (CAN), Local Interconnect Network (LIN), DeviceNet, ControlNet, Data Highway+, PROFIBUS, or PROFINET, among many others), cellular communication components, NFC components, Bluetooth® (or Bluetooth® Low Energy) components, WiFi® components, and other communication components. Network connectivity may be provided to/from the computing device 700 via the communication resources 730 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The communication resources 730 may include one or more dedicated processors and/or FPGAs to communicate using one or more of the aforementioned network interface protocols.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

3. Example Implementations

Figure 8:
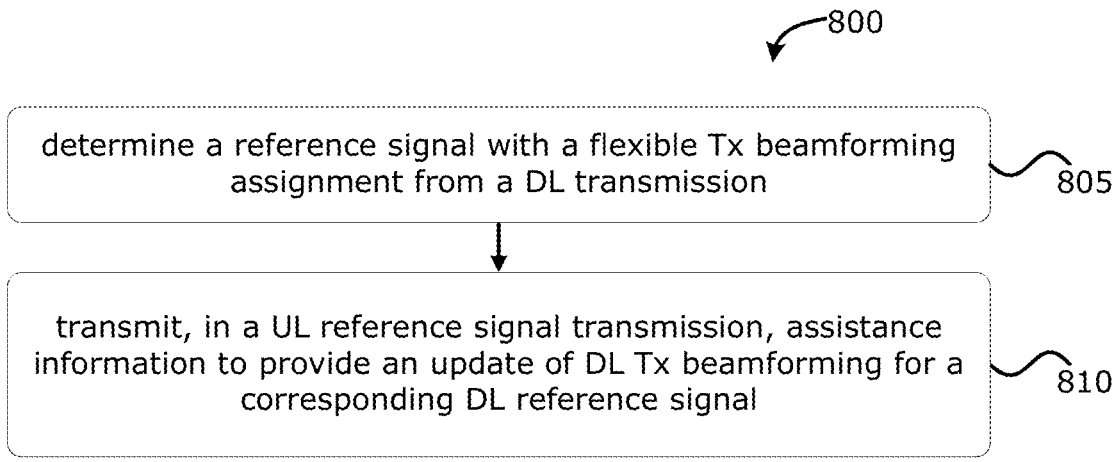
FIGS. 8, 9, and 10 show an example processes for practicing various embodiments herein.
Figure 9:
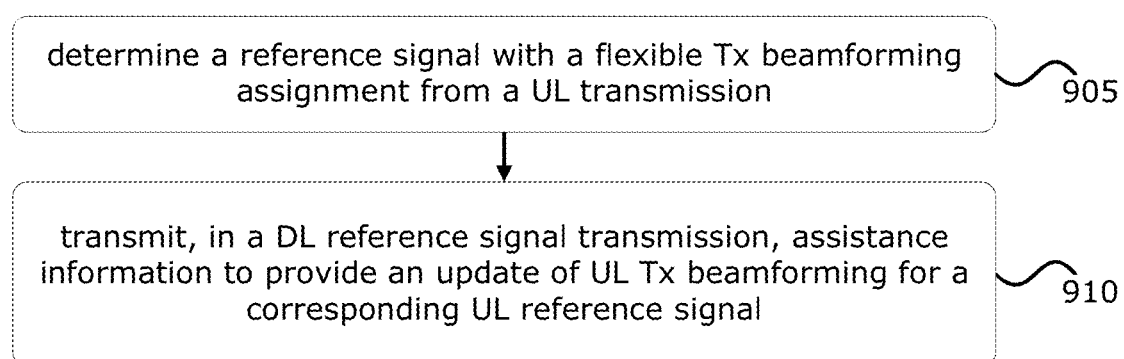
Figure 10:
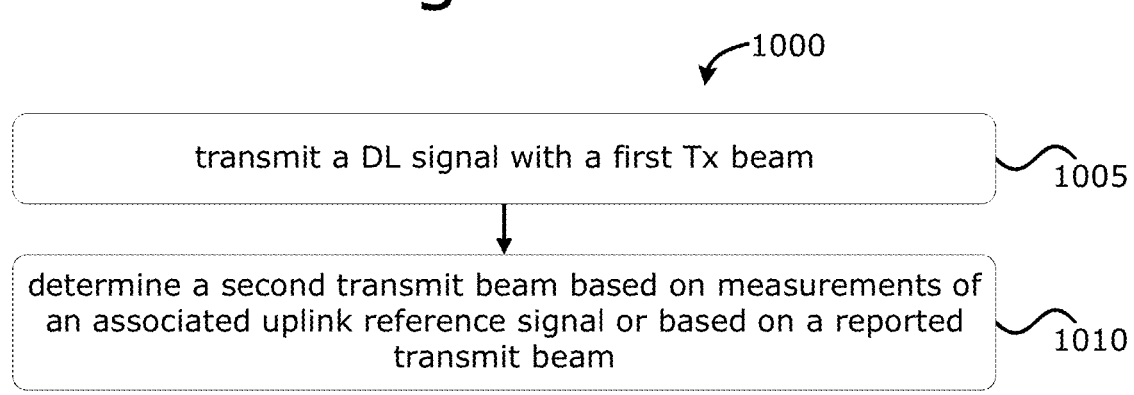

FIGS. 8, 9, and 10 shows example processes 800, 900, and 1000, respectively, in accordance with various embodiments. While particular examples and orders of operations are illustrated FIGS. 8, 9, and 10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring now to FIG. 8, process 800 begins at operation 805 where radio equipment (RE) (e.g., UE 202 or AN 208) determines a reference signal with a flexible Tx beamforming assignment from a DL transmission. At operation 810, the RE transmits, in a UL reference signal transmission, assistance information to provide an update of DL Tx beamforming for a corresponding DL reference signal. After operation 810, process 800 may end or repeat as necessary.

Referring now to FIG. 9, process 900 begins at operation 905 where radio equipment (RE) (e.g., UE 202 or AN 208) determines a reference signal with a flexible Tx beamforming assignment from a UL transmission. At operation 910, the RE transmits, in a DL reference signal transmission, assistance information to provide an update of UL Tx beamforming for a corresponding UL reference signal. After operation 910, process 900 may end or repeat as necessary.

Referring now to FIG. 10, process 10 begins at operation 1005 where radio equipment (RE) (e.g., UE 202 or AN 208) transmits a DL signal with a first Tx beam. At operation 1010, the RE determines a second transmit beam based on measurements of an associated uplink reference signal or based on a reported transmit beam. After operation 1010, process 1000 may end or repeat as necessary.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a method of flexible transmit beamforming assignment on a reference signal, wherein the method includes: indicating the reference signal with a flexible transmission beamforming assignment in a downlink; transmitting in an uplink of the reference signal or assistance information allowing update of a downlink transmission beamforming for a corresponding downlink reference signal; and/or associating the downlink reference signal with a downlink physical channel or other downlink reference signal(s) to indicate an actual transmission beam.

Example 2 includes a method of flexible transmit beamforming assignment on a reference signal, wherein the method includes: indicating the reference signal with flexible transmission beamforming assignment in an uplink; transmitting downlink reference signal or assistance information in the downlink allowing update of the uplink transmission beamforming of the corresponding uplink reference signal; and/or associating and uplink reference signal with an uplink physical channel or other uplink reference signal(s) to indicate in actual transmission beam.

Example 3 includes the method of example 1 or 2 and/or some other example(s) herein, wherein the corresponding downlink or uplink reference signals are the same.

Example 4 includes the method of example 3 and/or some other example(s) herein, wherein downlink reference signal is channel state information reference signal (CSI-RS) resource or CSI-RS resource set.

Example 5 includes the method of example 3 and/or some other example(s) herein, wherein uplink reference signal is sounding reference signal (SRS) resource or SRS resource set.

Example 6 includes the method of example 1 and/or some other example(s) herein, wherein associating the downlink physical channel or other downlink reference signal is done by TCI state (for example, by configuring the downlink reference signal in TCI state and configuring TCI state for the downlink physical channel or other downlink reference signal).

Example 7 includes the method of example 2 and/or some other example(s) herein, wherein associating the uplink physical channel or other uplink reference signal is done by spatial relation info (for example, by configuring the uplink reference signal in spatial relation info and configuring spatial relation info for the uplink physical channel or other uplink reference signal).

Example 8 includes the method of example 1 and/or some other example(s) herein, wherein downlink reference signal is configured with measurement restriction for large scale parameter used for quasi co-location indication.

Example 9 includes the method of example 2 and/or some other example(s) herein, wherein uplink reference signal is configured with spatial filter time restriction.

Example 10 includes the method of example 1 and/or some other example(s) herein, wherein the assistance information include reporting identity (ID) of the downlink reference signal using uplink control channel associated with the selected Tx beam.

Example 11 includes the method of example 10 and/or some other example(s) herein, wherein the reported Tx beam is assumed to be applied after K symbol after last symbol of uplink control channel used to report such assistance information.

Example 12 includes the method of example 2 and/or some other example(s) herein, wherein the assistance information include reporting identity (ID) of the uplink reference signal using downlink control channel associated with the selected Tx beam.

Example 13 includes the method of example 12 and/or some other example(s) herein, wherein the reported Tx beam is assumed to be applied after K symbol after last symbol of downlink control channel used to indicate such assistance information.

Example 14 includes a method comprising: transmitting a downlink signal with a first transmit beam; determining a second transmit beam based on measurements of an associated uplink reference signal (for example, an SRS) or based on a reported transmit beam.

Example 15 includes the method of example 14 and/or some other example(s) herein, further comprising: determining the reported transmit beam based on an identifier of a downlink reference signal, wherein the identifier is transmitted by a UE in a physical uplink control channel.

Example 16 includes a method comprising: receiving, in a downlink transmission, a downlink reference signal transmitted by a gNB with a first transmit beam; and update a receive beam for TCI or a transmit beam for SRS.

Example 17 includes the method of example 16 and/or some other example(s) herein, further comprising sending an identifier of the downlink reference signal in a physical uplink control channel.

Example Z01 includes an apparatus comprising means to perform one or more elements of a method described in or related to any of examples 1-17, or any other method or process described herein. Example Z02 includes one or more non-transitory computer-readable media comprising instructions to cause an electronic device, upon execution of the instructions by one or more processors of the electronic device, to perform one or more elements of a method described in or related to any of examples 1-17, or any other method or process described herein. Example Z03 includes an apparatus comprising logic, modules, or circuitry to perform one or more elements of a method described in or related to any of examples 1-17, or any other method or process described herein. Example Z04 includes a method, technique, or process as described in or related to any of examples 1-17, or portions or parts thereof. Example Z05 includes an apparatus comprising: one or more processors and one or more computer-readable media comprising instructions that, when executed by the one or more processors, cause the one or more processors to perform the method, techniques, or process as described in or related to any of examples 1-17, or portions thereof. Example Z06 includes a signal as described in or related to any of examples 1-17, or portions or parts thereof. Example Z07 includes a datagram, packet, frame, segment, protocol data unit (PDU), or message as described in or related to any of examples 1-17, or portions or parts thereof, or otherwise described in the present disclosure. Example Z08 includes a signal encoded with data as described in or related to any of examples 1-17, or portions or parts thereof, or otherwise described in the present disclosure. Example Z09 includes a signal encoded with a datagram, packet, frame, segment, protocol data unit (PDU), or message as described in or related to any of examples 1-17, or portions or parts thereof, or otherwise described in the present disclosure. Example Z10 includes an electromagnetic signal carrying computer-readable instructions, wherein execution of the computer-readable instructions by one or more processors is to cause the one or more processors to perform the method, techniques, or process as described in or related to any of examples 1-17, or portions thereof. Example Z11 includes a computer program comprising instructions, wherein execution of the program by a processing element is to cause the processing element to carry out the method, techniques, or process as described in or related to any of examples 1-17, or portions thereof. Example Z12 includes a signal in a wireless network as shown and described herein. Example Z13 includes a method of communicating in a wireless network as shown and described herein. Example Z14 includes a system for providing wireless communication as shown and described herein. Example Z15 includes a device for providing wireless communication as shown and described herein.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

IV. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SSB. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. One or more non-transitory computer-readable media (NTCRM) comprising instructions for flexible transmit (Tx) beamforming assignment on a reference signal, wherein execution of the instructions by one or more processors is to cause a radio equipment (RE) to:
 determine the reference signal with the flexible Tx beamforming assignment from a received downlink (DL) transmission; and
 transmit, in an uplink (UL) reference signal transmission, assistance information allowing update of DL transmission beamforming for a corresponding DL reference signal.

2. The one or more NTCRM of claim 1, wherein execution of the instructions is to cause the RE to:
 associate the corresponding DL reference signal with a DL physical channel or one or more other DL reference signals to indicate an actual Tx beam.

3. The one or more NTCRM of claim 2, wherein, to associate the DL physical channel or the one or more other DL reference signals, execution of the instructions is to cause the RE to:
configure the corresponding DL reference signal in a transmission configuration indicator (TCI) state; and
configure a TCI state for the DL physical channel or the one or more other DL reference signals.

4. The one or more NTCRM of claim 1, wherein the corresponding DL reference signal is configured with a measurement restriction for large scale parameters used for a quasi co-location indication.

5. The one or more NTCRM of claim 1, wherein the assistance information includes a reporting identity (ID) of the corresponding DL reference signal using a UL control channel associated with a selected Tx beam.

6. The one or more NTCRM of claim 5, wherein the selected Tx beam is assumed to be applied K symbols after a last symbol of the UL control channel used to report the assistance information.

7. The one or more NTCRM of claim 1, wherein the corresponding DL reference signal and the UL reference signal are a same type of reference signal.

8. The one or more NTCRM of claim 1, wherein the corresponding DL reference signal is a channel state information reference signal (CSI-RS) resource or CSI-RS resource set.

9. The one or more NTCRM of claim 1, wherein the UL reference signal is a sounding reference signal (SRS) resource or SRS resource set.

10. The one or more NTCRM of claim 1, wherein the RE is a user equipment (UE) or a Radio Access Network (RAN) node.

11. One or more non-transitory computer-readable media (NTCRM) comprising instructions for flexible transmit (Tx) beamforming assignment on a reference signal, wherein execution of the instructions by one or more processors is to cause a radio equipment (RE) to:
determine the reference signal with the flexible Tx beamforming assignment from a received downlink (DL) transmission; and
transmit, in an uplink (UL) reference signal transmission, assistance information allowing update of DL transmission beamforming for a corresponding DL reference signal, wherein the assistance information includes a reporting identity (ID) of the corresponding DL reference signal using a UL control channel associated with a selected Tx beam, and wherein the selected Tx beam is assumed to be applied K symbols after a last symbol of the UL control channel used to report the assistance information.

12. The one or more NTCRM of claim 11, wherein execution of the instructions is to cause the RE to:
associate the corresponding DL reference signal with a DL physical channel or one or more other DL reference signals to indicate an actual Tx beam.

13. The one or more NTCRM of claim 11, wherein execution of the instructions is to cause the RE to:
associate the corresponding DL reference signal with a DL physical channel or one or more other DL reference signals to indicate an actual Tx beam.

14. The one or more NTCRM of claim 13, wherein, to associate the DL physical channel or the one or more other DL reference signals, execution of the instructions is to cause the RE to:
configure the corresponding DL reference signal in a transmission configuration indicator (TCI) state; and
configure a TCI state for the DL physical channel or the one or more other DL reference signals.

15. The one or more NTCRM of claim 11, wherein the corresponding DL reference signal is configured with a measurement restriction for large scale parameters used for a quasi co-location indication.

16. The one or more NTCRM of claim 11, wherein the corresponding DL reference signal and the UL reference signal are a same type of reference signal.

17. The one or more NTCRM of claim 11, wherein the corresponding DL reference signal is a channel state information reference signal (CSI-RS) resource or CSI-RS resource set.

18. The one or more NTCRM of claim 11, wherein the corresponding DL reference signal is a tracking reference signal (TRS) resource or a TRS resource set.

19. The one or more NTCRM of claim 11, wherein the UL reference signal is a sounding reference signal (SRS) resource or SRS resource set.

20. The one or more NTCRM of claim 11, wherein the RE is a user equipment (UE) or a Radio Access Network (RAN) node.

* * * * *